(12) United States Patent
Zakrzewski

(10) Patent No.: US 9,474,092 B2
(45) Date of Patent: Oct. 18, 2016

(54) INFRASTRUCTURE EQUIPMENT AND METHOD

(75) Inventor: Robert Zakrzewski, Bristol (GB)

(73) Assignee: SCA IPLA HOLDINGS INC, New York, NY (US)

(*) Notice: Subject to any disclaimer, the term of this patent is extended or adjusted under 35 U.S.C. 154(b) by 162 days.

(21) Appl. No.: 13/880,873

(22) PCT Filed: Oct. 3, 2011

(86) PCT No.: PCT/GB2011/051870
§ 371 (c)(1),
(2), (4) Date: Aug. 15, 2013

(87) PCT Pub. No.: WO2012/056210
PCT Pub. Date: May 3, 2012

(65) Prior Publication Data
US 2013/0343256 A1 Dec. 26, 2013

(30) Foreign Application Priority Data
Oct. 25, 2010 (GB) .................................. 1017981.0

(51) Int. Cl.
*H04W 4/00* (2009.01)
*H04W 76/02* (2009.01)
(Continued)

(52) U.S. Cl.
CPC ........... *H04W 76/021* (2013.01); *H04W 4/005* (2013.01); *H04W 8/26* (2013.01); *H04W 74/0833* (2013.01); *H04W 74/006* (2013.01); *H04W 74/0808* (2013.01)

(58) Field of Classification Search
USPC ............... 370/310, 332, 342, 335, 432, 437; 455/435, 445, 450, 456, 509, 518, 519
See application file for complete search history.

(56) References Cited

U.S. PATENT DOCUMENTS 7,693,534 B1  4/2010 Lundy et al.
2003/0050076 A1* 3/2003 Watanabe .................... 455/456
(Continued)

FOREIGN PATENT DOCUMENTS

CN  1879334 A  12/2006
CN  101431748 A  5/2009
(Continued)

OTHER PUBLICATIONS

United Kingdom Search Report issued Feb. 16, 2011 in Patent Application No. 1017981.0.
(Continued)

*Primary Examiner* — Fan Ng
(74) *Attorney, Agent, or Firm* — Oblon, McClelland, Maier & Neustadt, L.L.P.

(57) ABSTRACT

An infrastructure equipment for forming part of a mobile radio network includes a transmit and receive unit, to transmit and receive data to and from mobile communications devices via a wireless access interface, and a controller processing requests for communications resources from the mobile communications devices. Plural associated communications devices are arranged to form a group, and each of the associated communications devices of the group includes a same common identifier, with respect to which communications sessions can be established to communicate data via the mobile radio network, and the controller is arranged in combination with the transmit and receive unit to respond to a request from one of the communications devices of the group to establish a communications bearer using the common identifier.

17 Claims, 10 Drawing Sheets

(51) Int. Cl.
*H04W 8/26* (2009.01)
*H04W 74/00* (2009.01)
*H04W 74/08* (2009.01)

(56) References Cited

U.S. PATENT DOCUMENTS

| | | | |
|---|---|---|---|
| 2005/0100037 A1* | 5/2005 | Burbidge et al. | 370/432 |
| 2007/0047500 A1* | 3/2007 | Usuda et al. | 370/335 |
| 2008/0070610 A1 | 3/2008 | Nishio | |
| 2008/0080472 A1* | 4/2008 | Bertrand | H04J 11/005 370/344 |
| 2008/0102843 A1* | 5/2008 | Todd et al. | 455/445 |
| 2008/0162584 A1* | 7/2008 | Papili et al. | 707/200 |
| 2008/0232329 A1* | 9/2008 | Jen | 370/335 |
| 2008/0268846 A1* | 10/2008 | Shaheen | 455/436 |
| 2009/0092086 A1 | 4/2009 | Lee et al. | |
| 2010/0080194 A1* | 4/2010 | Kawasaki et al. | 370/332 |
| 2010/0113051 A1 | 5/2010 | Du et al. | |
| 2010/0280956 A1* | 11/2010 | Chutorash et al. | 705/64 |
| 2011/0128911 A1* | 6/2011 | Shaheen | 370/328 |
| 2013/0329654 A1* | 12/2013 | Zakrzewski | 370/329 |

FOREIGN PATENT DOCUMENTS

| | | |
|---|---|---|
| EP | 1 505 766 A1 | 2/2005 |
| EP | 1 879 352 A2 | 1/2008 |
| EP | 2 068 532 A1 | 6/2009 |
| EP | 2 398 193 A1 | 12/2011 |
| WO | WO 97/48208 A1 | 12/1997 |
| WO | WO 04/002021 A1 | 12/2003 |
| WO | WO 04/002176 A1 | 12/2003 |
| WO | WO 2005/048466 A2 | 5/2005 |
| WO | WO 2005/122616 A1 | 12/2005 |
| WO | WO 2007/078177 A1 | 7/2007 |
| WO | WO 2009/035400 A1 | 3/2009 |
| WO | WO 2009/088338 A1 | 7/2009 |
| WO | WO 2010/017913 A1 | 2/2010 |
| WO | WO 2010/091588 A1 | 8/2010 |

OTHER PUBLICATIONS

International Search Report issued Dec. 23, 2011 in PCT/GB2011/051870.

Interdigital : "Group Based Registration and Access (Device Based Operation)", 3GPP TSG SA WG1 Meeting #49, vol. TD S1-100144, No. 49, XP-002630228, Feb. 22-26, 2010, 4 pages.

Interdigital Communication Corporation : "Device Based Optimization Solution for Smart Metering Support in 3GPP System", 3GPP TSG SA WG2 Meeting #78, TD S2-101007, vol. SA WG2, XP-050433603, Feb. 22-26, 2010, 4 pages.

Ericsson : "Dedicated Preamble Assignment", 3GPP TSG-RAN WG2#63bis, Tdoc R2-085260, XP-050320155, Sep. 29-Oct. 3, 2008, 5 pages.

United Kingdom Examination Report issued Nov. 25, 2013 in Patent Application No. GB1017981.0.

U.S. Appl. No. 13/881,168, filed Apr. 24, 2013, Zakrzewski.

U.S. Appl. No. 13/881,171, filed Apr. 24, 2013, Zakrzewski.

Japanese Office Action issued Sep. 1, 2015 in Japanese Patent Application No. 2013-535503. (7 pages).

"Group Based RAB & JP Assignment for 22.368", InterDigital Communication Corporation, 3GPP TSG-SA1 #49 S1-100140, Feb. 10, 2010. (4 pages).

"The Group Bearer for MTC", ZTE, 3GPP TSG SA WG2 Meeting #78, TD S2-100995, Feb. 12, 2010. (4 pages).

Combined Office Action and Search Report issued Nov. 25, 2015 in Chinese Patent Application No. 201180051359.6 (with English translation of Categories of Cited Documents).

* cited by examiner

UL virtual multiplexing

INFRASTRUCTURE EQUIPMENT AND METHOD

FIELD OF THE INVENTION

The present invention relates to communications systems which are arranged to communicate data with mobile communications devices via a wireless access interface. The present invention also relates to communications devices which communicate data with mobile radio networks, infrastructure equipment for mobile radio networks and methods for communicating data with mobile radio networks.

BACKGROUND OF THE INVENTION

Mobile communication systems have evolved over the past ten years or so from the GSM System (Global System for Mobiles) to the 3G system and now include packet data communications as well as circuit switched communications. The third generation project partnership (3GPP) has now began to develop a mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

At present mobile communications services are dominated by human to human (H2H) communications, that is, data which is transmitted by a human to another human or at least data that is transmitted for presentation to a human being. It is now recognised that there is a desire to cater for communications to and/or from machines which are referred to generally as machine type communications (MTC) or machine to machine (M2M) communications. MTC communications can be characterised as communicating data which has been generated from a source automatically, for example in response to some other stimulus or event reporting some attribute of the machine or some monitored parameter or so-called smart metering. Thus whilst human communications such as voice can be characterised as being communications requiring a communications session of some minutes with data being generated in bursts of several millisecond with pauses there between or video can be characterised as streaming data at a substantially constant bit rate, MTC communications can generally be characterised as sporadically communicating small quantities of data although it would be appreciated that there is also a wide variety of possible MTC communications.

As will be appreciated it is generally desirable to provide a mobile communications which use a radio communications bandwidth and core network resources as efficiently as possible, with respect to which MTC communications, for example, can provide a significant challenge.

SUMMARY OF THE INVENTION

According to the present invention there is provided an infrastructure equipment for forming part of a mobile radio network. The infrastructure equipment includes a transmit and receive unit, which is arranged in operation to transmit and receive data to and from mobile communications devices via a wireless access interface, and a controller for processing requests for communications resources from the mobile communications devices. A plurality of associated communications devices are arranged to form a group, and each of the associated communications devices of the group includes the same common identifier, with respect to which communications sessions can be established to communicate data via the mobile radio network, and the controller is arranged in combination with the transmit and receive unit to respond to a request from one of the communications devices of the group to establish a communications bearer using the common identifier.

According to some embodiments each of the associated communications devices of the group includes the same common identifier with respect to which communication sessions can be established to communicate data via the mobile radio network from any of the associated communications devices. The group of communications devices may be for communicating machine type communications (MTC) for a particular application such as for example, being disposed in a vehicle such as a car in order to report certain parameters. Each of these parameters may be served by a separate communications device which reports periodically on the parameters which are detected by an associated sensor. As such because of the spatial proximity of each of the communications devices, each is able to receive control plane signalling data and accordingly the communication of the signalling data is as if broadcast to a local environment in which the group of communications devices are disposed. Accordingly, there is a saving in communications bandwidth which is proportional to the number of the devices in the group.

The inventor of the present invention has recognised that a plurality of communications devices maybe associated with each other, which can be efficient for example when communicating MTC communications. For example, a plurality of associated communications devices maybe spatially disposed throughout a vehicle, such as a car, in order to monitor parameters or events of interest such things as engine performance, the temperature, the speed of the vehicle, direction of orientation and indeed the location of the vehicle. Each of these parameters maybe served by a separate communications device which reports periodically on the parameters which are detected by an associated sensor. In another example the communications devices maybe disposed throughout a public transport vehicle such as a train or a bus and may report on things like a number of passengers present in the vehicle, the amount of sales which have been made, the position of the vehicle and the performance of the engine. Other examples can be envisaged in the application of embodiments of the invention.

Embodiments of the present invention provide each of the communications devices in a group with the same identifier, for example by replicating the same Subscriber Identity Module (SIM) or for LTE the same Universal-SIM (U-SIM). As such although the communications devices may be identified individually at, for example, the physical layer or the radio access layer of a mobile radio network, at a higher layer, for example the media access control (MAC) layer or the application layer, the communications devices maybe addressed using a single identifier for establishing a communications session or addressing. In one example the identifier is an International Mobile Equipment Identity (IMEI). As such all control plane data and signalling which is communicated to the communications devices of the group will be communicated as if the mobile radio network is communicating with a single device. The control plane or signalling data may be for example mobility management signalling within the evolved packet system. As such because of the spatial proximity of each of the communications devices, each is able to receive the control plane signalling data and accordingly the communication of the signalling data is as if broadcast to a local environment in which the group of communications devices are disposed. Accordingly, there is a saving in communications bandwidth which is proportional to the number of the devices in the group.

In order to establish a communications session or switch the communications devices between an Evolved Packet System (EPS) Connection Management (ECM) connected state and idle state, a first of the communications devices of the group is arranged in operation to establish the communications session by transmitting signalling information including an identifier which is common to the group of communications devices to the mobile radio network via one or more of the base stations. Each of the associated communications devices in the group is then arranged to receive signalling information communicated from the mobile radio network on the downlink in response to signalling information transmitted by the first communications device on the uplink.

By arranging for one of the communications devices to transmit the signalling information to establish a communications session, each of the associated communications devices within the group can transmit data to the mobile radio network and/or receive data from the mobile radio network using a communications bearer established by the first communications device using the identifier which is common to all of the associated communications devices of the group. Thus one of the communications devices of the group acts as a "master" to perform all Non Access Stratum (NAS) communications to the network whereas all of the associated communications devices of the group are arranged to receive signalling information in accordance with NAS data from the mobile radio network. Thus the associated group of devices is configured such that one of those devices acts as a master for transmitting uplink signalling data to the network and whilst the home subscriber server (HSS) may store data which identifies each of the communications devices using the International Mobile Equipment Identifier (IMEI), the Media Access Layer (MAC) layer will respond as if the communication in respect of signalling and control plane information came from a single communications device. Accordingly, an efficiency in the communication of control plane and signalling data can be realised.

In one example, in respect of authentication and registration of the group of associated communications devices, transmission of information is done by the master device only.

In some embodiments the mobile radio network is arranged to communicate data to and from the communications devices using a wireless access interface which includes a random access communications channel for uplink transmission of signalling data, and each of the communications devices from the group of associated communications devices is allocated a predefined time among the group of devices to access the random access communications channel. Accordingly since the communications devices are associated with each other, between them they can be arranged to access the random access communications channel on a time divided basis to the effect that contention for accessing the random access communications channel can be at least reduced.

In some examples the group of devices is sub-divided into sub-groups, each sub-group being allocated to one of the predefined times. In this example the allocation of the times to access the random access can be made as short as possible, whilst still reducing an amount of contention when accessing the random access channel. Therefore whilst in some examples, each of the communications devices of the group could be allocated one time to access the radio access channel, this could result in the devices having to wait too long to transmit a request for up-link resources. Therefore, by sub-dividing the group of devices and allocating each of the sub-groups the same time to access the random access channel, a balance can be made between the probability of some contention access and a time which the communications devices have to wait before accessing the random access channel.

In other embodiments each of the communications devices within the group of associated communications devices is provided with one of a set of sequences of data for use in identifying the communications device when transmitting bursts of data to the mobile radio network via the wireless access interface. Each of the data sequences may be used, for example, as a pre-amble, mid-amble or post-amble in a transmission for identifying a source of the transmission when resolving contention access. The group of data sequences is uniquely associated with the group of communications devices. Alternatively, the data sequence may be a spreading code. The mobile radio network may be arranged to determine which of the communications devices of the associated group transmitted a burst of data and in response grant access to uplink resources by transmitting an indication of the grant of uplink resources on a downlink communications channel. To identify the device which is being granted the uplink resources, the data sequence which has been allocated to that communications device is included in the signalling data granting the uplink resources, which is transmitted on the downlink for example as a pre-amble, mid-amble or post-amble or a spreading code.

Thus embodiments of the present invention provide an arrangement in which the group of associated communications devices is allocated a predefined sequence which might be for example used as a preamble for transmitting data bursts via the physical layer for example the random access communications channel. The mobile radio network can then identify which of the communication devices transmitted the data in the random access channel. Accordingly, when granting uplink resources the mobile radio network communicates a grant message which includes the same preamble which it received in the request for uplink resources. All of the communications devices are arranged to listen to the control plane message allocating the uplink resources and using knowledge of the allocated predefined data sequence the communications device, which requested uplink resources, can identify itself as being granted those resources. Accordingly, for example, contention can be resolved between mobile communications devices which are allocated to the same sub-group and which can transmit in the same random access channel.

According to some embodiments the master communications device is arranged to communicate all NAS communications for the group. However if one of the slave communication devices of the group is communicating with the mobile radio network, when the network considers that a handover to another base station should be made (network directed handover) or the communications device itself considers that a handover should be made (mobile directed handover), then that slave device communicates the AS signalling data associated to execute the handover for the group. The other devices within the group listen for the down-link and up-link AS communications so that they can receive any messages required to attach to the target base station. If the communications devices of the group return to an idle mode then the master device communicates all of the NAS signalling which is required for mobility.

Further aspects and features of the present invention are defined in the appended claims and include a communications device for forming an associated group of communications devices and a method of communicating data.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

Figure 1:
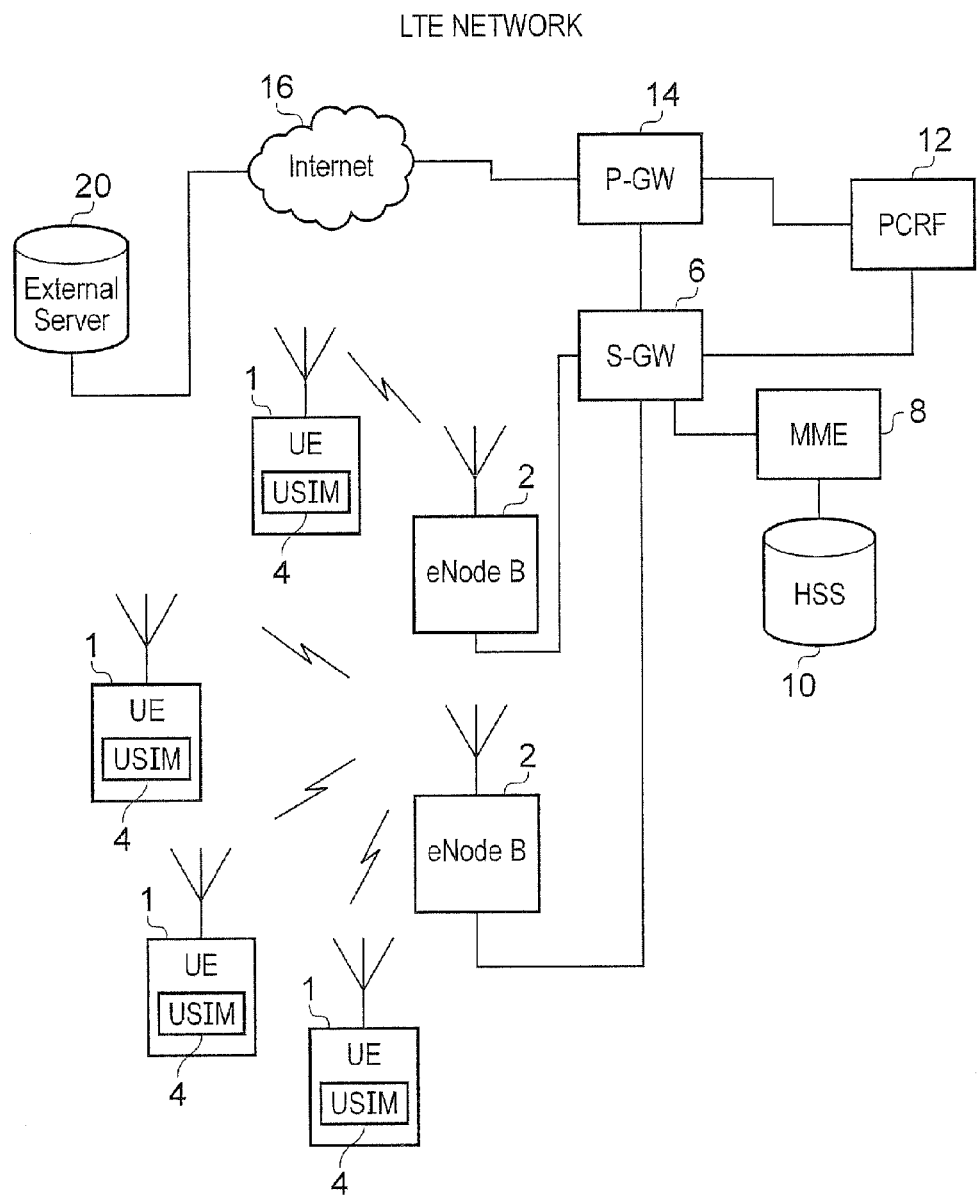
FIG. 1 is a schematic block diagram of a mobile radio network and a plurality of user equipment forming a communication system which operates in accordance with the 3GPP Long Term Evolution (LTE) standard.

Embodiments of the present invention will now be described with reference to an implementation which uses a mobile radio network operating in accordance with the 3GPP Long Term Evolution (LTE) standard. FIG. 1 provides the example architecture of an LTE network. As shown in FIG. 1 and as with a conventional mobile radio network, mobile communications devices designated as user equipment (UE) 1 are arranged to communicate data to and from base stations 2 which are referred to in LTE as enhanced NodeBs (eNodeB). As shown in FIG. 1 each of the mobile communications devices 1 includes a Universal Subscriber Identity Module (USIM) which includes information and parameters which allow the mobile communications devices to access the mobile radio network and to be authenticated for services to which the users have subscribed.

The base stations or eNodeB's 2 are connected to a serving gateway S-GW 6 which is arranged to perform routing and management of mobile communications services to the communications devices 1 as they roam throughout the mobile radio network. In order to maintain mobility management and connectivity, a mobility management entity (MME) 8 manages the enhanced packet service (EPS) connections with the communications devices 1 using subscriber information stored in a home subscriber server (HSS) 10. Other core network components include the policy charging and resource function (PCRF) 12 a packet data gateway (P-GW) 14 which connects to an internet network 16 and finally to an external server 20. More information may be gathered for the LTE architecture from the book entitled "*LTE for UMTS OFDN and SC-FDMA based radio access*", Holma H. and Toskala A. page 25 ff.

Communications with a Group of UEs

Embodiments of the present invention provide an arrangement in which a plurality of communications devices maybe associated with each other and grouped together in order to communicate data from different sources. It is envisaged that these sources of data may include data generated by machines so that the data maybe automatically generated sensor readings or events which require logging or other data which is generated by machines rather than by a human interaction. Embodiments of the present invention therefore find application with MTC communications. An example of the group of devices is illustrated in FIG. 2 where mobile communications devices 1 are associated with a group 22 and each is capable of communicating with the wireless access network shown in 24.

Figure 2:
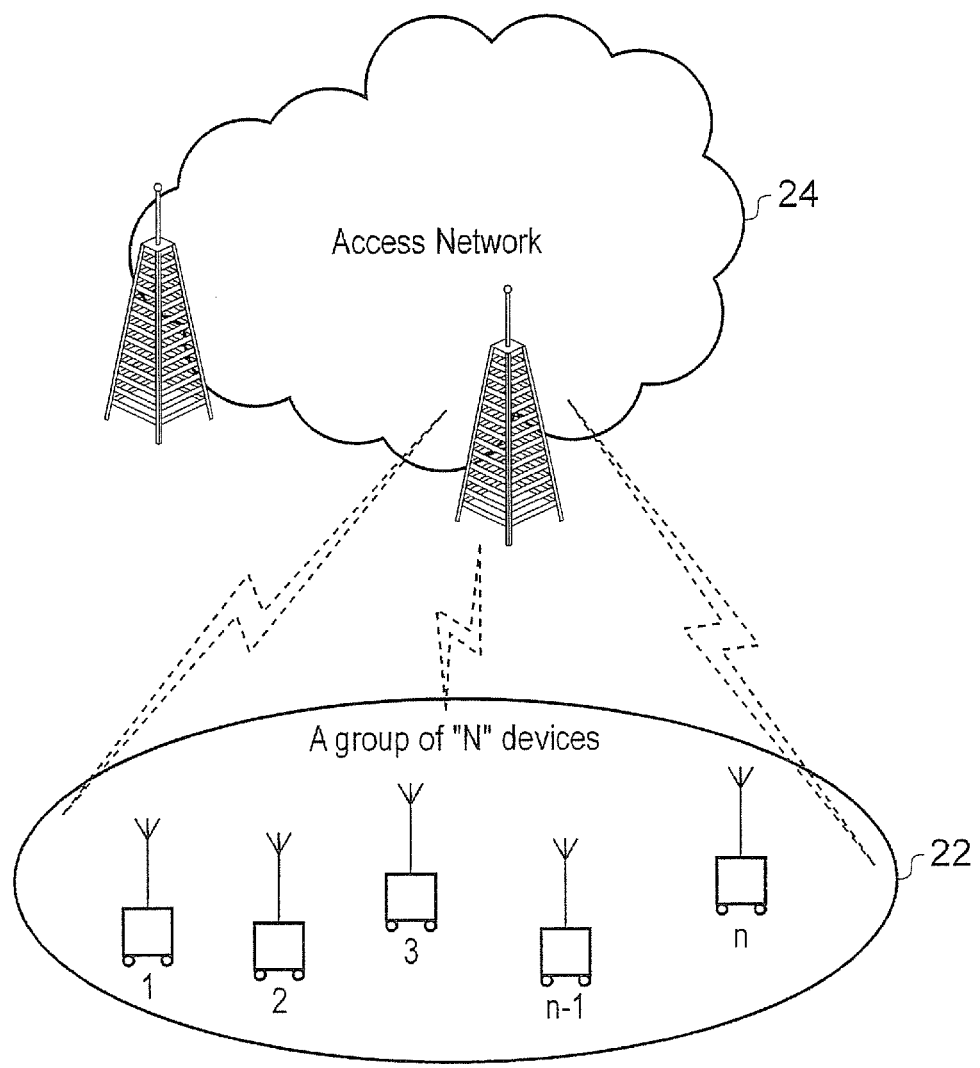
FIG. 2 is a schematic representation of a group of devices which is communicating with the wireless access network shown in FIG. 1.
Figure 3:
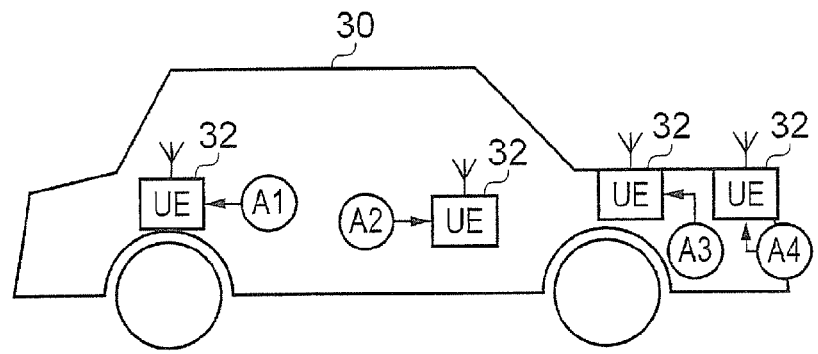
FIG. 3 is a schematic representation of a car which includes a plurality of communications devices which are reporting data generated by sensors disposed throughout the car.
Figure 4:
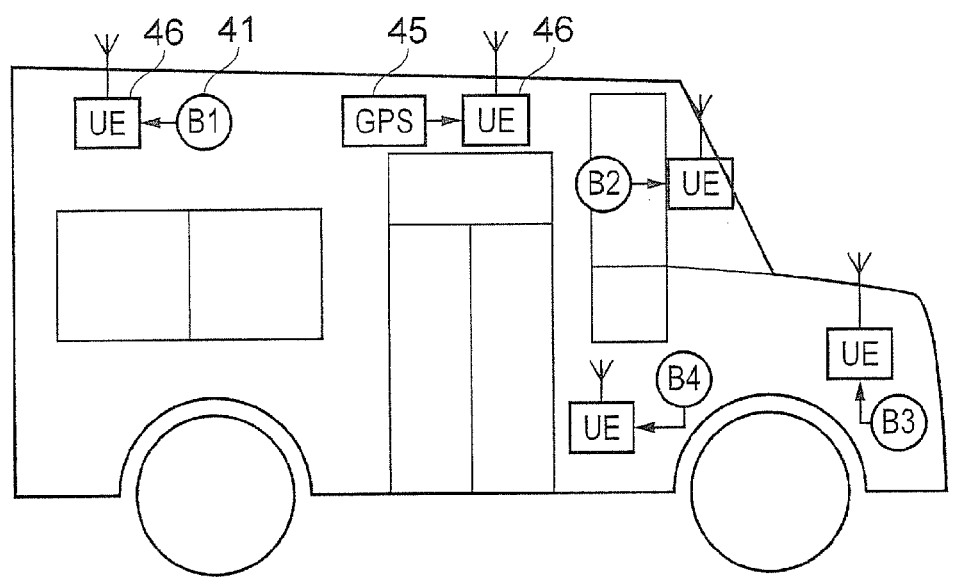
FIG. 4 is a schematic block diagram of a bus which includes a plurality of communications devices disposed throughout the bus which is reporting on information generated by sensors associated with each of the communications devices.

Examples where it might be appropriate to group devices as shown in FIG. 2 are provided in FIGS. 3 and 4. FIG. 3 provides an example of a car which includes a plurality of sensors A1, A2, A3, A4 which are receiving stimulus from other components within the car such as within the engine, monitoring the speed of the car or the tyre pressure etc. Any data generated by the sensors A1, A2, A3, A4 are fed to mobile communications devices 32 which may be spatially disposed throughout the car 30.

Another example is shown in FIG. 4 which maybe a bus, for example a bus providing public transport. The bus may also include a plurality of sensors B1, B2, B3, B4 and for example may also include a GPS device 45 which generates information automatically to represent the location of the bus 40. As for the example shown in FIG. 3 each of the sensors B1, B2, B3, B4, 45 shown in FIG. 4 has an associated communications device 46 for transmitting the data generated by these sensors B1, B2, B3, B4, 45 to an applications program running on a server which is connected to the internet. The data is communicated to that application program via a mobile radio network.

For the examples shown in FIG. 3 and FIG. 4, since the plurality of communications devices are commonly located, embodiments of the present invention aim to utilise that common location to reduce an amount of signalling over head which is required to establish a communications session and to communicate data from those communications devices via the mobile radio network. Embodiments of the present invention have therefore been devised to achieve such a utilisation and improvement in efficiency.

Figure 5:
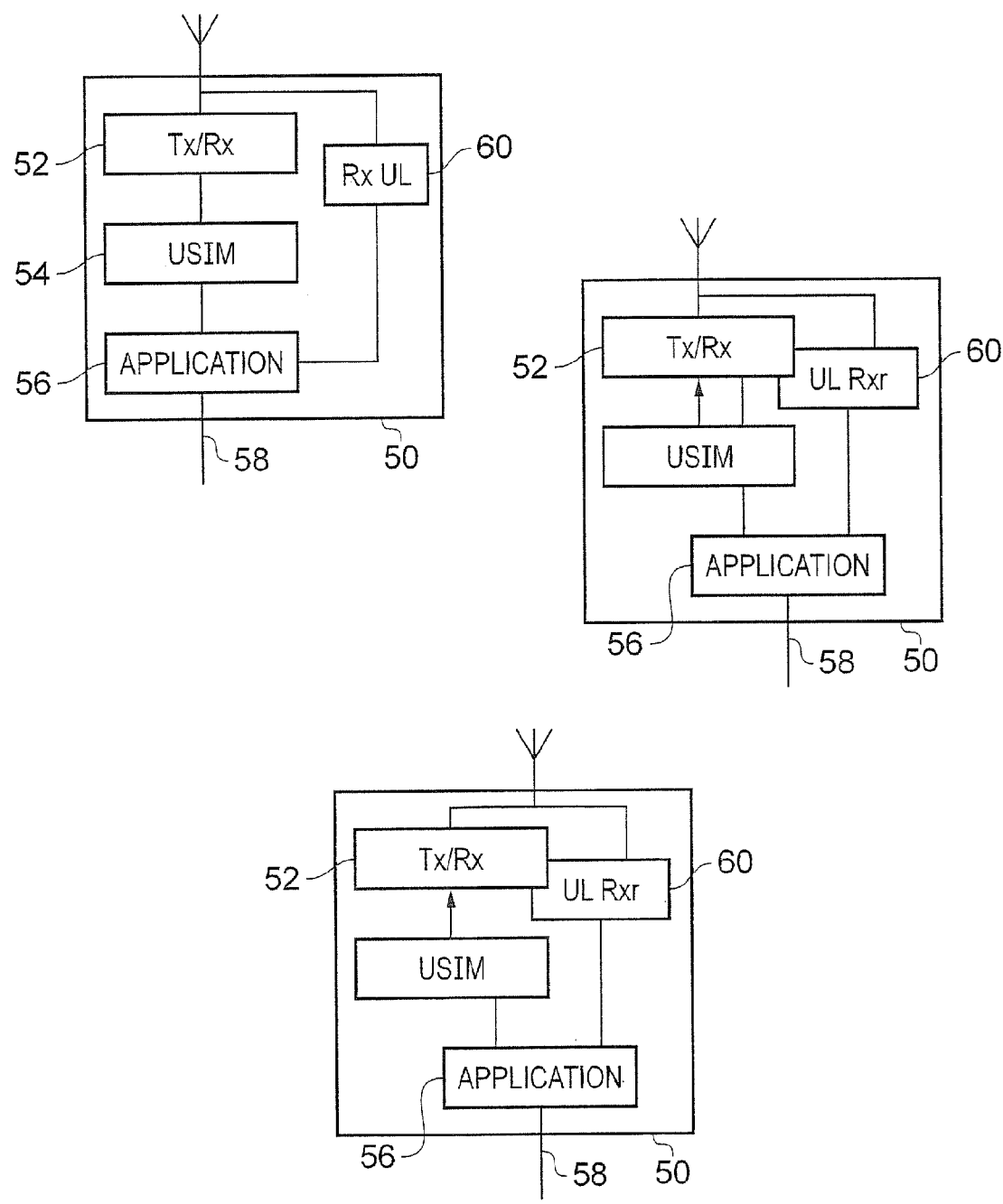
FIG. 5 is a schematic block diagram of three communications devices forming and associated group.

FIG. 5 provides a schematic illustration of three communications devices which are adapted to form an associated group of devices which may for example be used for the example applications illustrated in FIGS. 3 and 4. Each of the three devices 50 shown in FIG. 5 includes a transmitter and receiver which are arranged to communicate data to and from a base station of the mobile radio network 52. Each of the communications devices includes a U-SIM module 54 and an application processor 56 which is arranged to run an application program for communicating data to a corresponding application server connected to the mobile radio network.

As will be appreciated in some embodiments the application processor 56 may be a very simple device or may not be included in the communications devices 50, because the function provided by the communications device 50 is only required to communicate data generated by the sensors via a receiving input 58.

According to embodiments of the present invention the U-SIM 54 for each of the communications devices 50 contains the same identifier which identifies the communications devices to the network for the purpose of establishing a communications bearer. Thus the U-SIM may include the international mobile subscriber identity number (IMSI) or the GUTI which is common for the group of communications devices. Thus as shown in the table below the group of communications devices 50 shown in FIG. 5 can be addressed using various identifiers depending on whether it is an Access Stratum communication or a Non Access Stratum (NAS/AS) communication. For an AS communication the cellular radio network temporary identifier (CRNTI) maybe used for establishing a communications session for all members of the group. Also shown below is a table providing an indication of various ways in which the group or cluster of mobile communications devices may be addressed including how a higher layer identification maybe made using one unique URL/URI or IP address for the group or cluster.

| Cluster identifiers | |
|---|---|
| Domain | Identity |
| AS | One C-RNTI per group/cluster |
| NAS | One IMSI/GUTI per group/cluster |
|  | One IMEI per device |
| Higher Layer | One unique identifier e.g. URL/URI etc. per device |
|  | One IP address per group/cluster |

The communications devices 50 shown in FIG. 5 may also include an uplink receiver 60 which is arranged to detect and recover data transmitted by other communications devices of the group on the uplink to the mobile radio network using the transceivers 52.

As will be appreciated from the following explanation in other embodiments the uplink receiver 60 may be omitted.

As will be explained in the following paragraphs, in order to realise an efficiency gain by reducing the control plane signalling, one of the devices of the group acts as a master device and performs the transmission of signalling and information on the uplink to the mobile radio network to establish a communications session and to maintain a communication session in accordance with an enhanced packet system mobility and connection management ECM/EMM) function whereas the other devices of the group only listen to the down link communications. Thus part of the improvement in utilisation and efficiency of reducing communications and control plane information is that only one of the devices of the group is transmitting control plane information in the uplink.

Figure 6:
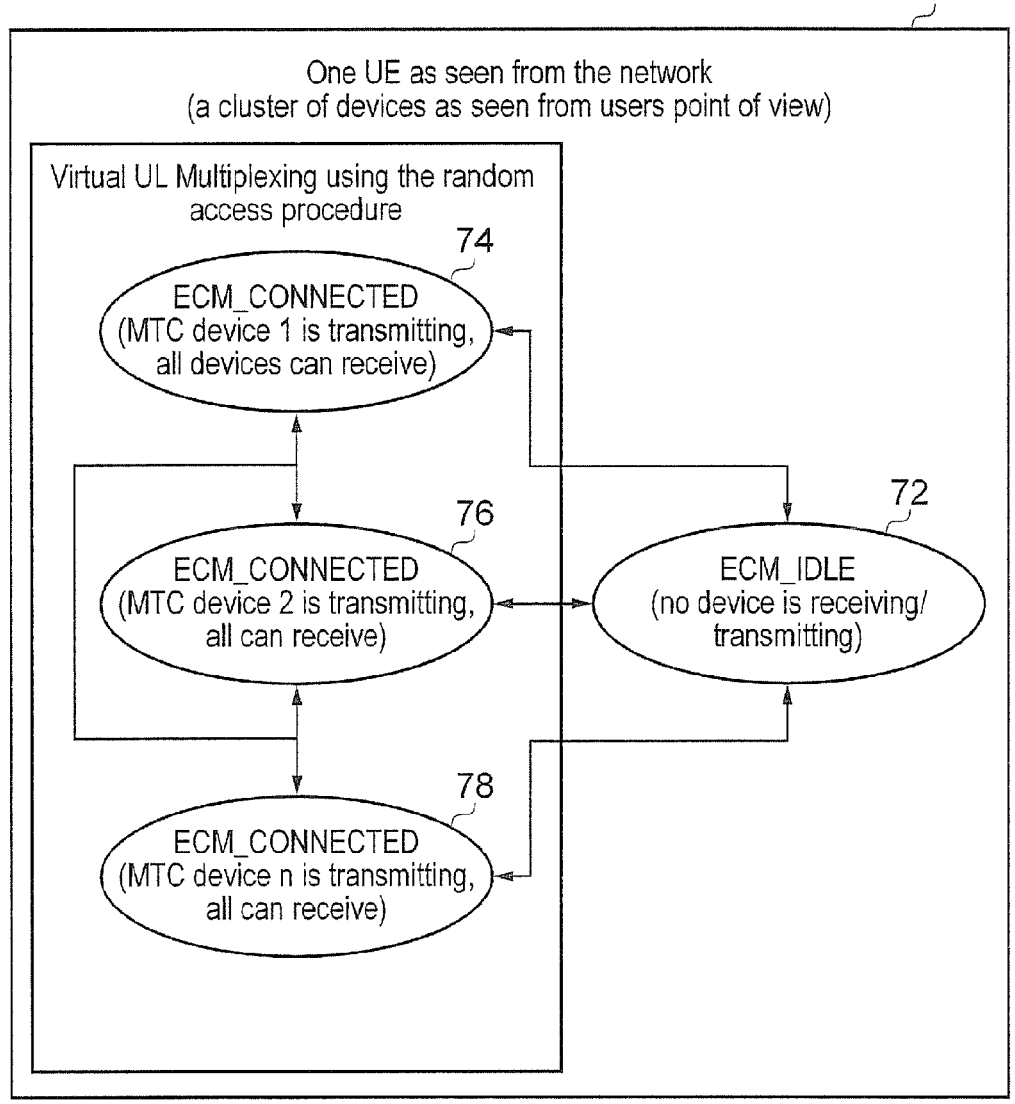
FIG. 6 is a schematic representation of process through which a virtual multiplexing is performed on the up-link between the group of communications devices.
Figure 7:
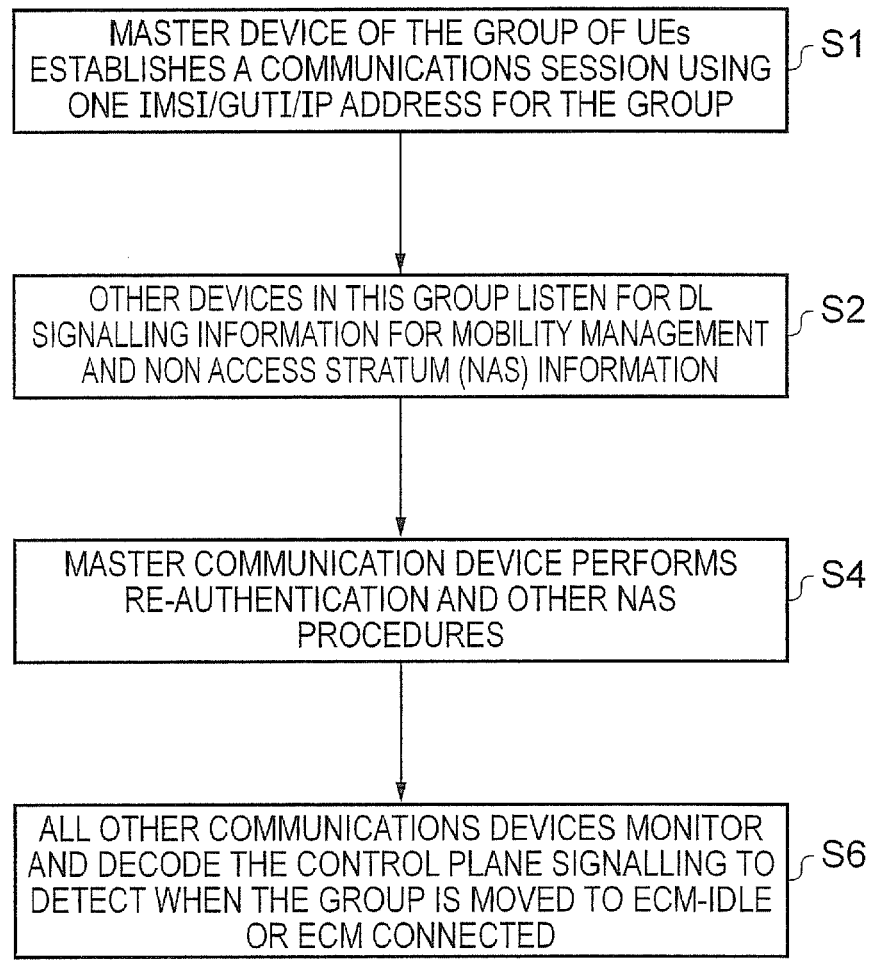
FIG. 7 is a flow diagram illustrating a process performed by a first or master communications device of a group and the other devices in the group in connecting to the mobile radio network.

FIG. 6 provides a system level organisation of the devices in the group. As illustrated by a box 70, as far as higher layer network functions are concerned, such as the radio access layer, all of the communications devices in the group can be regarded as a single communications device. Each of the devices in the group act as passive or "slave" device and one of the devices of the group acts as a master device. When none of the devices in the group are transmitting or receiving data then the communications devices enter an ECM Idle state 72. However, in respect of communicating either AS or NAS data any of the n communications devices of the group can enter an ECM connected state 74, 76, 78 in which case one of the devices is transmitting on the up-link and the other communications devices are receiving. Thus all of the communications devices of the group can enter an ECM connected state, but only one of the devices can be granted up-link resources at a time. However all of the devices in the group enter the ECM connected state in order that they can receive down-link transmissions as in effect a point to multi-point communication. Generally, the master communications device transmits all up-link messages for establishing a communications bearer, which is associated with NAS communications.

In FIG. 6 provides a flow diagram which illustrates a process by which the master communications device establishes a communication session for the group of associated communications devices shown in FIG. 5. The flow diagram is summarised as follows:

S1: One of the communications devices of the group acts as a master communications device or UE and establishes a communications session by communicating signalling information for example via the random access channel in order to perform the necessary communication with the mobile radio network. For example, the master UE may perfoim a PDP context activation request, or PDN connection request for establishing communications bearer or a similar bearer request protocol. The master UE uses the IMSI/GUTI or other identifier which is common to all members of the group. The master UE maybe for example the first UE of the group which wishes to communicate data via the mobile radio network in which case it acts as the master UE for establishing communications session. The other UEs may detect the control plane data using the uplink receiver 60. Alternatively one of the group members of the communications devices of the group may be pre-designated as the master UE and programmed accordingly in which case the uplink receiver 60 can be omitted to form a more simplified architecture.

S2: The other communications devices of the group which are associated together listen for the down link signalling information which is provided in response to the uplink transmissions form the master UE. The down link signalling information will include data required for mobility management and all. Non Access Stratum (NAS) information.

S4: although not part of the communications sessions establishment process, the master communications device continues to perform authentication and other NAS type communications for the group of devices. Correspondingly, all the devices in the group monitor the down link communications for receiving the necessary information as if the communications device itself had performed the uplink communication.

S6: All other communications devices monitor and decode the control plane signalling to detect when the group is moved from an ECM_IDLE state to an ECM_CONNECTED state.

According to embodiments of the present invention, the following adaptations are applied to a group of communications devices to function as a group so that improvements in the efficiency in control plane/NAS communications can be achieved:

- The group/cluster is identified by a unique C-RNTI and GUTI/IMSI common to all communications devices of the group.
- Communications from the mobile radio network to the group on the downlink appear as broadcast transmission with no adaptive modulation and coding.
- For downlink communications to the group of devices paging is supported.
- For uplink communications, a communications device must reserve uplink resources for a uni-cast transmission.
- Only the master communications device can be re-authenticated and performs other NAS procedures.
- Slave devices can implement a subset of procedures which are mandatory for the master group device.

Identification of the Associated Communications Devices of the Group

In some embodiments devices forming a group/cluster are indexed or identifiable separately from each other. As indicated above for the explanation of FIG. 6, this can be realised during the attachment procedure when the explicit authentication procedure is invoked (requesting IMEI) or implicitly when this information is managed by subscription information (USIM data). In the former case a standard procedure is used and C-RNTI per device is allocated during transition to the ECM_CONNECTED state (reserved pre-ambles are used in the random access (RA) procedure). After transition to ECM-IDLE, the following applies:

1. Devices foaming a group/cluster must be indexed. This can be realised during attachment when the explicit authentication procedure is invoked by the network. (the network requests IMEI which uniquely indentifies the device in the cluster and the index can be then allocated) or implicitly when this information is managed by subscription information (the USIM data). In the latter case, master device attaches to the network. In the former case a standard attach procedure is used by all devices in the cluster and one of them becomes the master device. After the attach procedure is completed all devices make transition to the ECM-IDLE state then the following applies.
2. After having all devices in the group registered the system can page the whole group (devices are in ECM_IDLE/EMM_REGISTERED).
3. One device in the group is marked as a master device (e.g. the device which was first attached or has special capabilities in the case when slave devices are simplified). This device responds to the paging message and is also the anchor device for NAS procedures i.e. re-authentication, the TAU procedure etc.
4. The device which wants to initiate the uplink transmission uses its unique preamble to invoke the RA procedure (the message 1). Once its preamble is echoed in the message 2 and possible contention is resolved in the message 4 the temporary-RNTI is promoted as the group C-RNTI.
5. Other devices passively listen to the RA procedure messages in order to obtain parameters such as the group C-RNTI. This is accomplished by searching for the group NAS identity (in the message 4) and optionally group pre-ambles (in the message 2) The timing advance parameter might also be used however it might not be accurate for dispersed devices. The TA correction will be obtained later when the MTC device invokes the RA procedure)
6. To save power the MTC device in ECM_IDLE are allowed to invoke the RA procedure at predefined time slots according to a function e.g. f(device number/index, IMSI)=hyper/radio frame number/sub frame/TTI etc. This is required to prevent slave devices from constant monitoring of the PDCCH to obtain C-RNTI (Conventional LTE devices can trigger the RA procedure at any time other devices in the cluster must detect this in order to obtain the group C-RNTI. This would be inefficient from a power saving point of view to require all devices to monitor the PDCCH constantly. This principle is similar to listening to the paging occasions. As an alternative predefined rules can be used for selecting the PRACH resources to be accessed by the group and this information enabled the MTC devices to choose timing occasions when the PDCCH needs to be monitored)
7. After the master device is triggered by the paging message, other slave devices passively decode any DL transmission constantly monitoring the PDCCH.
8. A sudo random function is defined: f_rand(hyper frame number, device number/index, preamble group)=preamble index. The function is used to make sure that all devices in the group use a different preamble when the contention based RA procedure is invoked. As the RA response message can be delayed, the function can not assign the same preamble indexes for X frames/TTIs. This is necessary to distinguish between two RA attempts from devices belonging to the same group/cluster (a contention resolution will not work for these devices as they have the same NAS identifier). Please note that devices can clash in the group and this is resolved by the use of unique preambles. Any contention with UEs which do not belong to the group is resolved by means of NAS identifiers.
9. Once the MTC device has been granted the UL resources, the message 3 is sent (see Annex 1). After any contention has been resolved (with devices which do not belong to the group/cluster) the cluster device starts transmitting UL data.
10. Other devices in the group/cluster do not attempt to initiate the UL transmission until there are not any allocations on the PDCCH for the group C-RNTI (an inactivity timer must also expire) or the transmitting device and cluster are moved to ECM_IDLE. The former requires the L2 protocols to be kept in sync (e.g. sequence numbers etc.), the latter requires passive decoding of AS signalling to detect when the RRC connection release message is sent. This approach blocks other devices as long as the transmitting device has data to send. Alternatively the transmitting device stops after e.g. Y TTIs/ms so that the transmitting device is moved to ECM_IDLE allowing other devices to request UL resources (via the RA access) and start transmitting. This is effectively implicit (without signalling) UL transmission brokering between cluster devices.

11. L2 synchronisation may be achieved explicitly by monitoring or implicitly by resetting the L2 protocols to a default state after there are not any allocations on the PDCCH for some predefined time (i.e. the inactivity timer expires).
12. MTC devices can also be restricted in that how much data they are allowed to transmit once they become the transmitting device regardless if the L2 synchronisation or transition to the ECM-IDLE state are used to indicate to other devices that they are permitted to initiate the UL transmission.
13. Only master device can be re-authenticated and performs other NAS procedures.
14. Slave devices can implement a subset of procedures which are mandatory for the master group device.
15. Devices which join the group later may need to initiate the attach procedure which will be handled by the MME differently to the first attach i.e. the IMEI is always requested from the MTC device, the device is authenticated and security functions are triggered (new security credentials are passed for the whole group). No new PDP context is established just the existing PDP context information is passed.
16. The UL virtual multiplexing concept which uses random access procedure (preamble and NAS contention resolutions) used for data transfer to terminals belonging to the group is illustrated in FIG. 6.

Up-Link Communication by Communications Device in the Group

As will be appreciated from the explanation provided above only the master communications devices is arranged to transmit signalling information to establish a communications session. However any of the devices iof the group may at some time transmit data in the up-link and therefore wil require up-link resources. Conventionally this is arranged by the mobile communications device transmitting a random access signal in a random access channel such as, for example, the PRACH of the LTE system. The base station receiving the random access signal includes an arrangement to resolve contention between two mobile communications device transmitting a random access signal in the same up-link PRACH. However according to the present technique the group of communications devices are arranged to reduce a likelihood of contention by dividing the communications devices of the group into sub-groups of devices and pre-allocating a time when the communications devices of the sub-group can access the PRACH. As explained above, each of the devices in the group or at least the sub-group is provided with a unique data sequence to use as a pre-amble, mid-amble or post-amble, which can be used to resolve contention.

Figure 9:
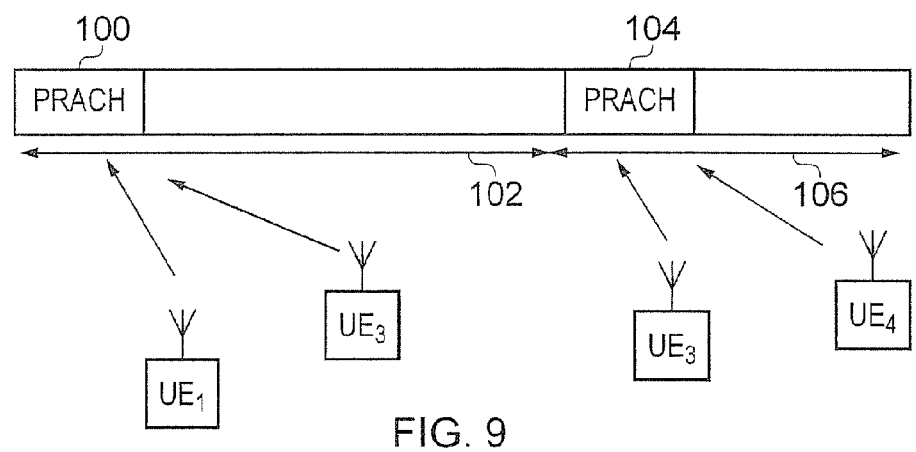
FIG. 9 is a schematic diagram illustrating the logical arrangement of the physical random access channel shown in FIG. 7 with respect to sub-groups of the communications devices.
Figure 10:
FIG. 10 is a representation of a burst of data transmitted by the communications devices shown in FIG. 8.

As explained above in some embodiments predefined sequences are allocated to the group of associated communications devices, which are unique to each of the communications devices in that group or at least within a sub-group which are allocated the same times for allocating the up-link random access channel. Accordingly, in the event of a contentious access of the random access communications channel the mobile radio network can respond by identifying if possible which of the communications devices successfully accessed the random access communications channel. This arrangement is illustrated in FIGS. 8, 9 and 10.

Figure 8:
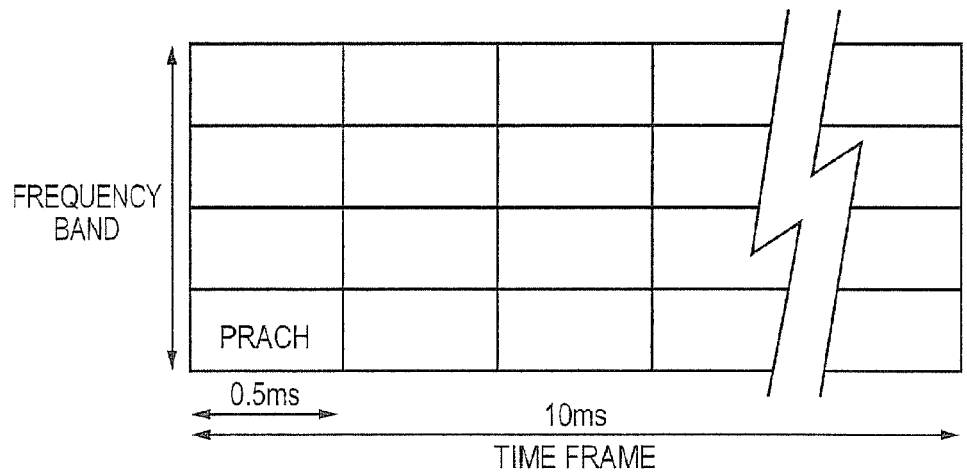
FIG. 8 is a schematic representation of a physical layer channels including a physical random access channel.

FIG. 8 provides an illustrative representation of the SC-FDMA uplink transmission scheme for the physical layer which includes a plurality of time slots which are divided from a 10 millisecond frame into slots of 0.5 milliseconds. More detail is provided according to the LTE standard as explained in chapter 5 of "LTE for UMTS OFDMA and SC-FDMA based radio access" by Holma H and Toskala A at page 83 ff". In addition, the frequency band is divided so that a matrix arrangement provides the UE's a plurality of communications physical channels which are allocated by the mobile radio network to the UE's on request. The request for an allocation of uplink resources is provided by transmitting a signal in a physical random access channel (PRACH). A logical arrangement of the access to the random access channel PRACH is shown in FIG. 9.

According to the present technique in order to avoid contention between the communications devices of the group each device is allocated a time when it can, if it needs to, access the PRACH according to a function (f_rand) of the hyper frame number, the radio frame number, the device number or its index (the cell phone number being the same for all of the communications devices of the group) and the TTI, which has been explained above. Thus each of the communications devices within the group is provided with a predefined time slot in order to access the PRACH. As shown in FIG. 9 each of two communications devices, UE1, UE3 is allocated the same time 100 in a first sub-frame 102 when it can transmit, if it needs to, a random access signal in a PRACH channel. A second sub-group of device UE2, UE4 is allocated a second time 104 in a subsequent frame 106 when either device can transmit a random access signal. By sub-dividing the devices of the group into sub-groups a likelihood of contention between the communications devices of the group is reduced.

In order to balance a likelihood of their being contention on the PRACH and a time that each of the communications devices has to wait before they can request Up-link resources, more than one communications device may be allocated to the same PRACH. That is to say that the group of devices are divided into sub-groups and each of these groups is allocated the same PRACH, within a scheduled time sharing of access to the PRACH. Therefore there is no limit on the size of the group with respect to a minimum time for access a PRACH or a capacity of the PRACH. However, as a result contention access will occur. Accordingly contention resolution is required. To this end, each of the communications devices of the group is provided with a unique data sequence which it uses as a preamble for transmitting in the PRACH. FIG. 10 illustrates a burst of information which maybe transmitted in the PRACH and includes a preamble field 90 and a Non Access Stratum (NAS) identifier 92. Each of the communications devices is provided with a unique data sequence from one of 64 possible data sequences for use as a preamble. As illustrated in FIG. 10 each of the devices of the group is provided with a unique preamble whereas other devices within the cell attached to the base station are provided with a different set of preamble sequences or another group of communications devices is provided with a different set of preamble sequences from the 64 available preambles.

Since each of the devices within the group is provided with a unique preamble, when one of the communications devices transmits a burst in the PRACH then the mobile radio network is able to identify that the uplink resources are required by the particular communications device. Accordingly when granting uplink resources, the mobile radio network and more particularly the base station/eNodeB perhaps in combination with the S-GW or the MME responds with that communication device's unique preamble so that when listening to the grant of uplink resources, that communications device is able to identify that communications resources for the uplink have been granted to it.

Figure 11:
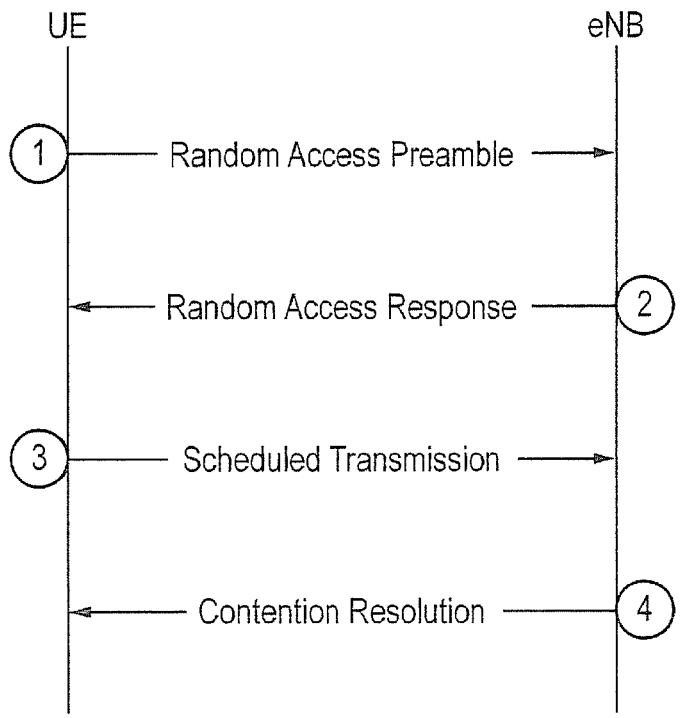
FIG. 11 is a diagram illustrating a message exchange between one of the mobile communications devices of a group with a base station in order to gain access to uplink communications resources.

A representation of the contentious access for uplink communications resources for the group of communications devices is provided by the message flow shown in FIG. 11, is reproduced from TS 36.300 and presented here is assist in understanding the embodiments of the present technique. The message exchange illustrated in FIG. 11 provides four messages, which are explained as follows:

1) Random Access Preamble on RACH in Uplink:

A communications device of the group of communications devices uses a preamble which has been derived from the f_rand function. The preamble uniquely identifies the communications device within the group. Contention may still exist for access to the random access channel. If another communications device from the same sub-group also transmits contemporaneously in the random access channel then path loss may be used to determine which group a preamble is selected from. The group to which a preamble belongs provides an indication of the size of the message 3 and the radio conditions at the UE. The preamble group information along with the necessary thresholds are broadcast on system information.

2) Random Access Response Generated by the Media Access Layer (MAC) on the Downlink Shared Channel (DL-SCH):

The communications devices identifies that the grant of uplink resources is for it using the unique random access preamble identifier.

This communication is semi-synchronous with message 1, because it is within a flexible window of which the size is one or more transmission time interval (TTI). There is no HARQ, the message is addressed to the RA-RNTI on the PDCCH. This message conveys at least the random access preamble identifier, Timing Alignment information, initial uplink grant and assignment of Temporary C-RNTI, which may or may not be made permanent upon Contention Resolution. This is intended for a variable number of UEs in one DL-SCH message.

3) First Scheduled Uplink Transmission on the Uplink Shared Channel:

This message is sent by the communications device which recognised its unique preamble in message 2. The message has the following characteristics:

This message uses Hybrid Automatic Repeat Request (H-ARQ);

The size of the transport blocks depends on the uplink grant conveyed in step 2 and is at least 80 bits.

This message conveys the radio resource connection (RRC) Connection Request generated by the RRC layer and transmitted via CCCH;

This message conveys at least an NAS UE identifier but no NAS message;

RLC TM: no segmentation;

For RRC Connection Re-establishment procedure (only by the master communications device);

This message conveys the RRC Connection Re-establishment Request generated by the RRC layer and transmitted via Common Control Channel (CCCH);

RLC TM: no segmentation;

This message does not contain any NAS message.

This message is communicated after handover, from the base station in the target cell, but only from the master communications device;

This message conveys the ciphered and integrity protected RRC Handover Confirm generated by the RRC layer and transmitted via DCCH;

This message conveys the C-RNTI of the UE sending it as established when requesting uplink resources or following a Handover Command;

Includes an uplink Buffer Status Report when possible.

For other events this message is sent by the communications device which recognised its random access preamble in the message 2.

4) Contention Resolution on the Downlink:

All of the communications devices in the group listen to the message 4 including the communications device which recognised its random access preamble identifier communicated in message 2. This message is characterised by the following attributes:

Early contention resolution is used in that the eNodeB does not wait for an NAS reply before resolving contention;

This message is not synchronised with message 3;

This message uses Hybrid Automatic Repeat Request (H-ARQ);

This message is addressed to the Temporary C-RNTI on the PDCCH for initial access and after radio link failure to the C-RNTI on PDCCH for UE in RRC CONNECTED;

H-ARQ feedback is transmitted only by the UE which detects its own UE preamble identifier, as provided in message 3, which is provided in response to the Contention Resolution message;

For initial access and RRC Connection Re-establishment procedure, no segmentation is used (RLC-TM);

The Temporary C-RNTI is promoted to C-RNTI for a UE which detects random access success and does not already have a C-RNTI; it is dropped by others. A UE which detects random access success and already has a C-RNTI, resumes using its C-RNTI.

Figure 12:
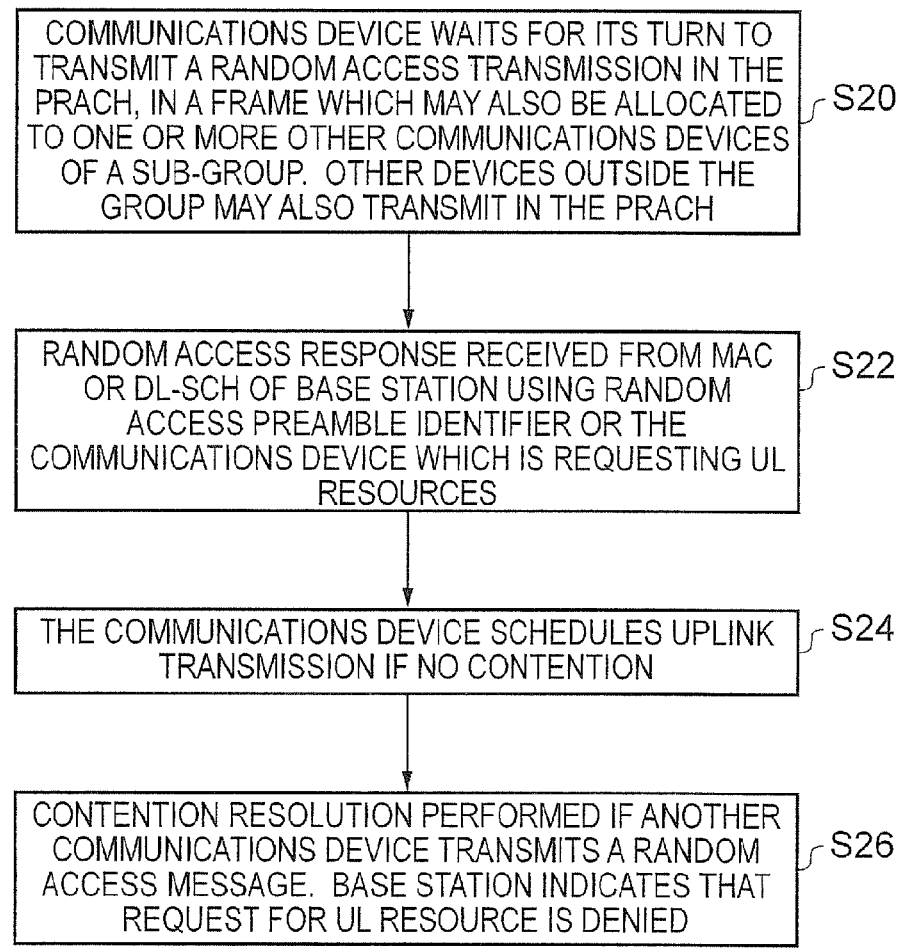
FIG. 12 is a flow diagram illustrating the operation of master communications device when accessing the random access channel to request uplink resources.

In summary FIG. 12 provides a flow diagram indicating the operation of the group of communications devices when gaining access to the uplink resources. The steps illustrated in FIG. 12 are summarised as follows:

S20: The communications device waits for its turn to transmit in the uplink PRACH in accordance with prearranged time division of the available PRACH timeslots in respect to the other communications devices. The communications device uses its unique random access preamble to transmit a request to have uplink resources to the mobile radio network by transmitting a burst of signals using the preamble in the PRACH. However this may be contemporaneous with another communications device from the same sub-group or indeed another communications device not within the group of associated communications devices. This is because the random access procedure is used by the devices which belong to the sub-group as well as devices which do not belong to the group. There are two levels of contention, which are resolved by either using the preambles allocated by the device of the group and final resolution by an NAS identifier. The devices in the sub-group use preambles which are unique within the sub-group. The first contention resolution is used to discriminate between devices in the sub-group. If they are not in the sub-group, but belong to the group of devices, then contention should not occur because each sub-group is allocated a different time slot in order to avoid contention in the first place. However in both cases it is possible that devices which do not belong to the group of devices will attempt the up-link access and this is the case when the second contention is resolved with the help of NAS identifiers.

S22: If an eNodeB can resolve one of the random access transmission in the PRACH, the eNodeB can respond by providing a response from the MAC or downlink shared channel from the eNodeB and uses the random access preamble identifier of the communications device which transmitted in the PRACH. Thus the eNodeB is able to uniquely identify the communications device from within the sub-group of to which it is granting the uplink resources using the preamble assigned to that communications device. Obviously if the random access transmission was by a communications device which is outside the group then contention is resolved in the usual way as mentioned above.

S24: Having received a response from the eNodeB the communications device schedules its transmissions on the uplink in accordance with the allocated uplink resources provided there was no contention for the uplink PRACH when it transmitted its burst.

S26: If there was contention when the communications device transmitted the random access transmission in step S20 on the PRACH, because another communications device in the sub-group or a device outside the group of devices transmitted a random access transmission in the PRACH and the eNodeB cannot resolve the transmissions then the eNodeB will respond immediately to indicate that there was contention on the random access channel. Thus the base station indicates that the request transmission of the random access communication in the PRACH was unsuccessful. Accordingly the communications device identifies that its attempt to gain uplink resources was unsuccessful and therefore re-transmits a random access burst in the PRACH when its scheduled turn comes round again.

Non-Contention Access of Uplink Resources Used by Master UE

Figure 13:
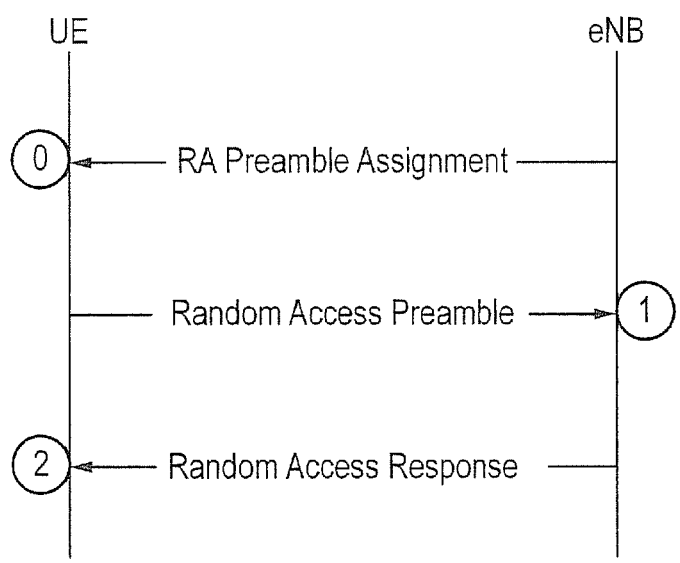
FIG. 13 is a diagram illustrating a message exchange between a first or master communications device of a group for non-contentious access to uplink communications resources.

A non-contention based random access procedure is only used by the transmitting communications device during handover or by the master device when positioning data is requested. As with the other communications devices of the group, the master communications device is provided with a preamble which is unique to that device. Furthermore random access is not contentious because the master communications device or the communications device responsible for effecting handover is allocated a time to access the PRACH which is not shared with other communications devices. Accordingly there is no contention access resolution required for the master communications devices, and so the request for uplink resources explained above is modified for the master communications device as explained below:

The three steps of the non-contention based random access procedure are represented by the message flow diagram of FIG. 13 and summarised as follows:

0) Random Access Preamble Assignment Via Dedicated Signalling in DL:

The eNodeB assigns to UE a non-contention Random Access Preamble. This is a Random Access Preamble which is not within the set of pre-ambles which is sent to the other UEs from within the group for use in broadcast signalling. This non-contention Random Access Preamble is signalled to the master UE using either;

A Handover command generated by target eNodeB and sent from the source eNodeB for handover, which is handles by the master UE; or Using the PDCCH in the case of downlink data arrival or positioning, which is again being handled by the master UE in the group, although the other devices in the group also detect the message;

1) Random Access Preamble on the RACH in uplink, which is transmitted by the master communications device of the group. This message is transmitted by the master UE using the non-contention Random Access Preamble.

2) Random Access Response on the Downlink Shared Channel (DL-SCH):

This message is transmitted in a semi-synchronous manner to message 1 within a flexible window of which the size is two or more TTIs. The message has the following attributes;

This message does not use Hybrid Automatic Repeat Request (H-ARQ);

The message is addresses to RA-RNTI on PDCCH;

This message conveys at least timing alignment information and initial uplink grant for handover, timing alignment information for downlink data arrival; the random access-preamble identifier.

This message is intended for one or multiple UEs in one downlink shared (DL-SCH) message.

Figure 14:
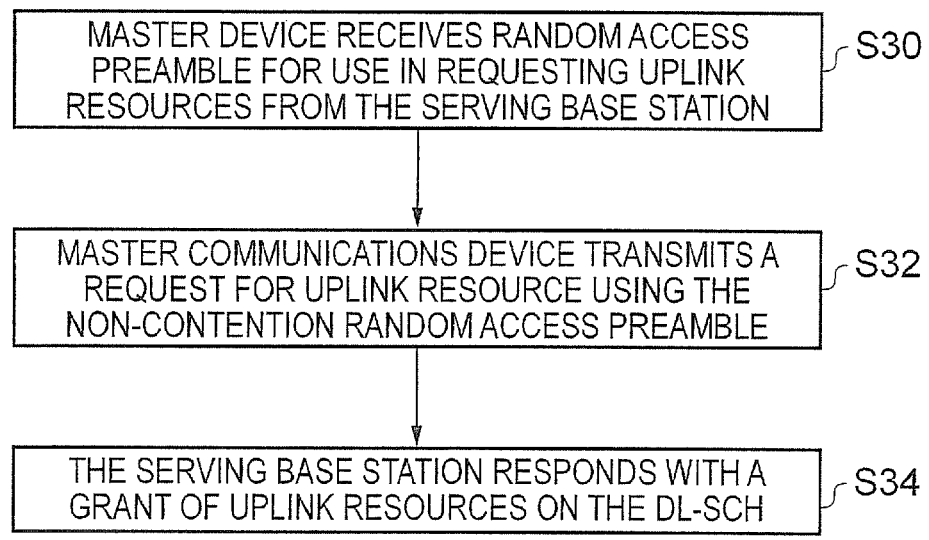
FIG. 14 is a flow diagram illustrating the operation of master communications device when accessing the random access channel to request uplink resources.

As illustrated in FIG. 14 the following steps are taken for the master device to secure uplink resources:

S30: The master device receives a random access preamble for use in requesting uplink resources from this serving base station.

S32: The master communications device transmits a request for uplink resources using the non contentious random access preamble.

S34: The serving base station responds with the grant of uplink resources on the down link shared channel.

As will be appreciated from the example embodiments described above, some or all of the embodiments can provide the following advantages:

A cluster of communications devices can be addressed by one C-RNTI/IMSI. A cluster of communications devices can receive data simultaneously via the downlink. Broadcast transmission techniques are applied in a cell for localised delivery to a cluster of communications devices The uni-cast paging procedure is used to activate downlink reception in a cluster of devices.

In known systems the UE selects a preamble identifier at random. According to some embodiments random access preambles are used to discriminate between communications devices in a cluster.

Any device in the cluster can request uplink resources to send data despite having the same NAS identifier (also C-RNTI). This is enabled by defining an implicit brokering function which prevents other devices to interfere by uncoordinated uplink transmission. The E-UTRAN is not able to distinguish which cluster device is transmitting.

A power saving means is defined for other communications devices in the cluster of devices to limit PDCCH monitoring in ECM_IDLE.

Operation of the Associated Communications Devices

As may be understood from the explanation of the example embodiments presented above, the following advantages are provided:

Authorisation and charging can be established for a group/cluster of communications devices rather than for each device individually;

NAS communications and procedures per group/cluster are handled by a nominated master device providing a reduction in signalling communications;

Implementation of the communications devices of the group apart from the master device can be simplified (light weight slave devices);

The group of communications devices can use one C-RNTI/IMSI;

Uplink data communications from the group of devices will be aggregated across the group making communications for the session more efficient.

In order to achieve these advantages it will be necessary for all of the communications devices of the group to monitor and decode control plane signalling, and hence the communications devices may include an up-link receiver 60. For example the communications devices of the group are arranged in one embodiment to detect when the group is moved to EMC_IDLE (no need for keeping Layer 2 in sync as the L2 is re-instantiated on re-transition to ECM_CONNECTED) and/or Layer 2 needs to be synchronised in order to be able to initiate uplink transmission by other cluster devices while in ECM_CONNECTED. This requires transmission monitoring for the group C-RNTI. Furthermore adaptive modulation and coding cannot be used for downlink communications, all devices in the group/cluster must have the same hardware capabilities including security functions etc. In addition, in some embodiments, the following modifications are made to the mobile radio network infrastructure:

A scheduling function at the eNodeB is modified in order to enable "broadcast like" transmission for selected C-RNTIs;

The eNodeB must be pre-provisioned with information that a group of communications devices form a cluster. The eNodeB marks the allocated C-RNTI as the one used for group communication with the cluster.

If the attach procedure is used by slave devices, the MME is provided with an identification that subsequent attachments are triggered by devices forming a group/cluster.

If connection oriented protocols at higher layers are used, some restrictions and limitations might apply in the scenario when one IP address is allocated to a cluster.

Various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as 3G, GSM, UMTS, CDMA2000 etc. The term communications device as used herein can be replaced with user equipment (UE), mobile communications device, mobile terminal etc. Furthermore, although the term base station has been used interchangeably with eNodeB it should be understood that there is no difference in functionality between these network entities and that in other architectures the base station will combine with radio network controller to perform some of the functions which have been performed by the eNodeB/Base Station in the above description and therefore corresponding changes could be made when applying the above invention to GPRS, 3G or other architectures.

The invention claimed is:

1. An infrastructure equipment for forming part of a mobile radio network, the infrastructure equipment including a transceiver configured to transmit and receive data to and from communications devices via a wireless access interface, and a controller configured to process requests for communications resources from the communications devices, wherein a plurality of associated communications devices are arranged to form each of plural groups, and each of the associated communications devices of a respective group includes the same common identifier, respond to a request from one of the communications devices of the respective group to establish a communications session using the common identifier, the communications session being used to communicate data to and from any of the communications devices of the respective group, provide each of the communications devices within each of the plural groups of associated communications devices with a unique one of a set of predefined sequences of data for use in forming a random access burst for transmission in a random access channel of the wireless access interface, a different set of predefined sequences being uniquely associated with each respective group, and transmit a message in response to a random access burst, using the predefined sequence which was used to form the random access burst received from a communications device.

2. An infrastructure equipment as claimed in claim 1, wherein the common identifier, which is used to establish a communications session is provided using a subscriber identifier module or universal subscriber identity module, which includes the same common identifier for each of the communications devices in each respective group.

3. An infrastructure equipment as claimed in claim 1, wherein the common identifier is a network temporary identifier or is used to generate a unique resource location or unique resource identifier.

4. An infrastructure equipment as claimed in Claim 1, wherein the infrastructure equipment is arranged to identify each of the devices using an equipment identification number, the equipment identification number being used by a radio link layer to identify each of the communications devices within each respective group of communications devices.

5. An infrastructure equipment as claimed in claim 1, wherein a first of the plurality of associated communications devices in a respective group is arranged to be a master communications device and the infrastructure equipment is configured to establish a communication session for the respective group in response to receiving signalling information including the common identifier from the master communications device, and transmit signalling information to the respective group of communications devices in response to the signalling information transmitted by the master communications device, such that each of the associated communications devices transmit data to the mobile radio network and receive data from the mobile radio network using the communications session established by the master communications device using the common identifier for all of the associated communications devices of the respective group.

6. An infrastructure equipment as claimed in claim 5, wherein the signalling information transmitted in response to the master communications device includes information required for mobility management and connection.

7. An infrastructure equipment as claimed in claim 1, wherein the communications devices forming each group are mounted on a common mobile system.

8. An infrastructure equipment as claimed in claim 1, wherein the random access burst received from one of the communications devices includes data representing a request for uplink resources and in response to the transmitted random access burst the controller communicates a grant of uplink resources to the communications devices of the respective group, using the same predefined sequence allocated to the communications device and received in the random access burst.

9. A method of communicating data from an infrastructure equipment forming part of a mobile radio network, the method comprising:
providing a transceiver for transmitting and receiving data to and from communications devices via a wireless access interface, and
processing requests for communications resources from the communications devices, wherein a plurality of associated communications devices are arranged to form each of plural groups, and the processing of the requests for communications resources includes
responding to a request from one of the communications devices of a respective group to establish a communications session using a common identifier,
establishing a communications session using the common identifier to communicate data via the mobile radio network to and from any of the communications devices of the respective group,
providing each of the communications devices within each of the plural groups of associated communications devices with a unique one of a set of predefined sequences of data for use in forming a random access burst for transmission in a random access channel of the wireless access interface, a different set of predefined sequences being uniquely associated with each respective group, and
transmitting a message in response to a random access burst, using the predefined sequence which was used to form the random access burst received from a communications device.

10. A method as claimed in claim 9, comprising
receiving the common identifier, which is used to establish a communications session, from a subscriber identifier module or universal subscriber identity module, which includes the same common identifier for each of the communications devices in a respective group.

11. A method as claimed in claim 9, wherein the common identifier is a network temporary identifier or is used to generate a unique resource location or unique resource identifier.

12. A method as claimed in claim 9, wherein the establishing a communications session for communicating data via the mobile radio network, using the common identifier includes establishing a communications session using a first of the plurality of associated communications devices which operates as a master communications device, and
transmitting signalling information including the common identifier for each of the associated communications devices in the respective group when the respective group of communications devices are in a listening mode in which the signalling information can be received in response to the signalling information transmitted by a master communications device, such that each of the associated communications devices is configured to transmit data to the infrastructure equipment and receive data from the infrastructure equipment using the communications session established by the first communications device using the common identifier which is common for all of the associated communications devices of the respective group.

13. A method as claimed in claim 12, wherein the signalling information received from the infrastructure equipment in response to the first communications device includes information required for mobility management and connection.

14. A method as claimed in claim 9, wherein the infrastructure equipment provides a wireless access interface which includes a random access communications channel for uplink transmission of a burst of signals, and the method includes
allocating to each of the communications devices from the respective group of associated communications devices a time for transmitting a random access burst in the random access communications channel in accordance with a predetermined arrangement.

15. A method as claimed in claim 14, wherein the predetermined arrangement includes allocating a time to each of the communications devices of the respective group, such that one or more of the communications devices is configured to transmit the random access burst in the random access communications channel.

16. A method as claimed in claim 9, wherein the random access burst includes data representing a request for uplink resources and the method includes
in response to the transmitted random access burst, communicating from the infrastructure equipment to the respective group of communications devices a grant of uplink resources, using the same predefined sequence allocated to the communications device.

17. A method as claimed in claim 9, wherein the communications devices forming each group are mounted on a common mobile system.

* * * * *